United States Patent [19]
Appleton

[11] 3,738,311
[45] June 12, 1973

[54] PRESSURE INDICATORS

[75] Inventor: Ronald John Walter Appleton, Bromley, Kent, England

[73] Assignee: Firemaster Extinguisher Limited, London, England

[22] Filed: Jan. 18, 1972

[21] Appl. No.: 218,776

[52] U.S. Cl. ............... 116/70, 73/419, 169/23, 169/31, 277/2
[51] Int. Cl. ............................................. G01l 19/12
[58] Field of Search ............... 116/70, 65, 117, 116/114; 73/419; 169/23, 30, 31, 32; 137/551, 557, 251, 384; 251/324; 277/177, 178, 237, 2

[56] References Cited
UNITED STATES PATENTS

| | | | |
|---|---|---|---|
| 2,263,840 | 11/1941 | Franck | 116/117 R X |
| 3,080,016 | 3/1963 | Thomas | 116/70 X |
| 3,181,496 | 5/1965 | Bilbrey | 116/70 |
| 3,203,246 | 8/1965 | Horwitt et al. | 73/419 |
| 3,413,024 | 11/1968 | Farquhar | 277/237 X |
| 3,448,620 | 6/1969 | Ryan | 73/419 |
| 3,594,745 | 7/1971 | Nickels | 116/70 X |

Primary Examiner—Louis J. Capozi
Attorney—Norris & Bateman

[57] ABSTRACT

Pressure indicator for fluid pressure containers, e.g., fire extinguishers is of simple construction and enables a user to readily ascertain whether or not internal pressure exceeds a predetermined level.

The indicator includes a fixed member defining a duct to open to the container exterior, and a plunger member forming a closure for and movable longitudinally of the duct, a fluid seal being provided by an O-ring or like elastomeric sealing element mounted on one member in continuous sealing engagement with a face of the other member throughout the range of said movement. Said face includes a step or other constriction giving predetermined resistance to movement of the plunger member on abutment by the sealing element which is only overcome if the fluid pressure acting on the plunger member exceeds said predetermined level. Thus failure of the plunger member to return to a fully extended position following depression by a user indicates the pressure is below said level.

9 Claims, 4 Drawing Figures

PATENTED JUN 12 1973 3,738,311

PRESSURE INDICATORS

This invention relates to pressure indicators for incorporation in fluid pressure containing assemblies, typically pressure containers, whereby a check can be made as to whether pressure within the assembly is below or above a pre-determined level.

The invention has particular but not exclusive application to fire extinguishers of the stored pressure type, in which an extinguisher body holds a charge of extinguishant under fluid pressure, for example a charge of dry powder extinguishant under gas pressure. Fire extinguishing apparatus is subjected to lengthy periods of non-use, often under adverse conditions as in vehicles or boats, and not always under periodic inspection by specialists, and undue reliance may easily be placed on apparatus which is no longer reliable or even operable due, for example, to undetected leakage. Thus it is particularly desirable that a ready means of checking the condition of an extinguisher is available as a built-in feature and can easily be operated by a person having no special skills and without the use of test equipment or the need to unseal and re-charge the extinguisher.

The object of the invention is to provide a pressure indicator which is of particularly simple construction yet which is reliable and efficient in use.

According to the invention a fluid pressure indicator for a fluid pressure containing assembly comprises a first member adapted to be mounted in the assembly so that a duct defined by said member extends between the pressure containing interior of the assembly and its exterior; a second member co-operating with the first member to form a fluid-tight seal for said duct while being movable relative to the first member longitudinally of the duct between a first position at which it is operatively extended towards or into said interior and a second position at which it is operatively withdrawn further from or less far into said interior, fluid pressure within the assembly in use acting on the second member to urge it towards the second position; and actuating means selectively operable from the exterior of the assembly in use to move the second member to the first position and to sense the relative position of the members: characterized in that one of the members mounts an elastomeric annular sealing element for continuous sliding fluid sealing engagement with a sealing face of the other member throughout the full range of said relative movement, and said sealing face includes a constriction at a position intermediate the first and second positions providing a pre-determined resistance to movement of the sealing member towards the second position which is only overcome by the application of a load in excess of a predetermined level to the second member.

A preferred embodiment of the invention, with certain modifications thereof, is now more particularly described with reference to the accompanying drawings wherein.

Figure 1:
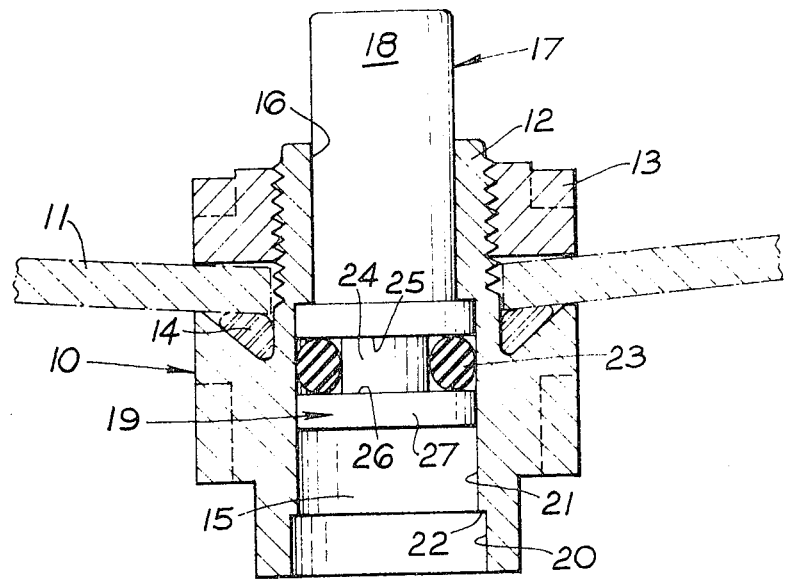
FIG. 1 is a longitudinal sectional view of a pressure indicator for a fire extinguisher with a plunger member at one position.

Referring to FIG. 1 the indicator comprises a body member 10 shown operatively mounted in an aperture in a concave wall portion of a fluid pressure containing fire extinguisher body 11 by means of a threaded boss 12 locked by means of a nut 13, a fluid seal between the body member and said wall being formed by means of a resilient gland washer 14. Alternatively body 10 may be mounted in or on some other part of the extinguisher assembly communicating with the fluid pressure containing parts thereof, for example on a filling plug or the like.

The face of an interior wall of body member 10 defines a cylinder 15 forming the inner part of a duct extending through the body to the exterior of the extinguisher, the remaining part of said duct co-axial with boss 12 forming a cylindrical guide 16.

Located in sliding engagement in member 10 is a plunger member 17 having a stem 18 extending through guide 16 to protrude to the exterior of the body, and a piston 19 located in cylinder 15.

Figure 2:
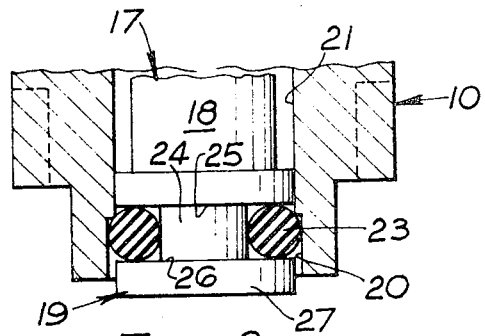
FIG. 2 is a like view to FIG. 1 (part broken away) showing said plunger member at another position.

Cylinder 15 is in two sections, a first greater diameter section 20 opening directly to the interior of the extinguisher remote from guide 16, and a lesser diameter section 21 extending between section 20 and said guide. The two sections are connected by a transition section forming a constriction in the cylinder and consisting of a radial face 22 forming a step in the cylinder wall. The diameter of piston 19 is such that it will pass freely from end to end of the cylinder between a first position (as shown in FIG. 2) in which it lies at least partially within the greater diameter section 20 and a second position (shown in FIG. 1) at which it abuts the end of the guide 16.

In order to provide a fluid-tight seal between members 10 and 17 throughout the full travel of the latter an elastomeric O-ring 23 is located in a groove 24 defined in the periphery of piston 19. Said groove is defined between radial faces whose spacing is such that the ring 23 is slightly axially compressed so that it protrudes radially outwards of the piston. The degree of radial compression is such that when the ring is in the larger section 20 of the cylinder it provides an adequate fluid pressure seal between the two members and also provides pre-determined resistance to longitudinal movement of the plunger from the first position to the second position when ring 23 abuts the step 22.

Figure 3:
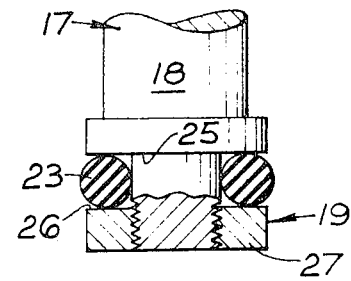
FIG. 3 is a part sectional detail of said plunger member.

Adjustment of the force necessary to urge the ring past this step towards the second position is provided by forming the piston in two parts as shown in FIG. 3, one radial face 25 being defined on a main part of the piston integral with stem 18, and the other radial face 26 being defined on a threaded collar 27 in screw engagement with the other part of piston 19. Though this provision for adjustment is not essential to the invention it is found to be desirable because the fit between O-ring 23 and groove 24 is critical if the most accurate results are to be obtained and standard O-rings have a thickness tolerance of ± 0.003 inch while adjustment is necessary to within ± 0.0005 inch. A fine thread is used to give accurate adjustment and when the desired setting has been made said flange is locked in position by means of an adhesive. Preferably both members are formed from synthetic plastics material and the adhesive used may be an anaerobic cyanoacrilate adhesive which will set almost immediately in the absence of oxygen, thus setting is assured even where the piston is immediately enclosed within the fluid contained in the extinguisher.

Control of the pre-determined loading necessary to urge the piston from the first to the second position is also effected by selecting an O-ring or other elastomeric annular element having the desired dimensions and resilience and/or the depth and shape of the groove 24 and the relative diameters of the two cylinder sections 21 and 20. The shaping of the step 22 may also be varied, for example, instead of being a right-angled step defined by a radial face it may be rounded or chamfered.

Assuming the indicator to be located on the extinguisher body as illustrated in FIG. 1, and the extinguisher to contain a charge of extinguishant and propellant under pressure, when it is desired to test the pressure level the stem 18 of the plunger member 17 is manually pressed inwards of the extinguisher until its outer end is flush with the end of boss 12. In this position the piston enters the larger section 20 of the cylinder 15, i.e. it takes up the first position. The stem is then released so that the piston is urged towards the second position by reason of the fluid pressure. If said pressure is above the pre-determined minimum level the loading applied to the piston will be sufficient to overcome the resistance caused by engagement of ring 25 against the constriction 22 as shown in FIG. 2 and the plunger member will travel the full length of its path to return to its second position shown in FIG. 1. Thus the stem 18 will again protrude fully from boss 12 indicating that the extinguisher contains full working pressure. On the other hand if the pressure has dropped, for example due to undetected leakage, and does not amount to the minimum level the force exerted on piston 19 will not be sufficient to drive the ring past the constriction 22 so that, even when released, the plunger will remain in the position shown in FIG. 2. The position of the stem 18 will indicate that the extinguisher is not in working order, thus a user will be warned to take steps to have it replaced or re-charged. Stem 18 may be provided with graduations or colored markings to emphasize the different respective positions.

In some applications the indicator may be applied to indicate the presence of excessive pressure within an assembly, safe working pressure being indicated by the plunger remaining at the first position when depressed, and a danger level of pressure being indicated by the plunger returning to the second position.

Figure 4:
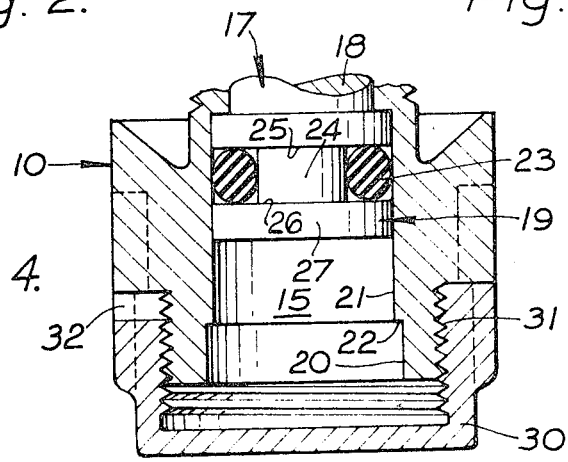
FIG. 4 is a view of a modified form of the indicator of FIGS. 1-3 including a filtering closure.

In the case of extinguishers containing a charge of dry powder extinguishant it was found that clogging of the indicator giving inaccurate readings was caused by the presence of accumulation of powder within cylinder 15. The modified form of indicator illustrated in FIG. 4 is provided with an internally threaded filtering closure in the form of a synthetic plastics cap 30 which is screw-engaged on an external thread 31 at the end of body member 10 remote from boss 12. The fit of the threads is such that they provide a very fine leak path some five inches long between the exterior of the cap (that is communicating with the pressure filled interior of the extinguishing assembly) and the interior of cylinder 15. A notch 32 in the rim of the cap which abuts body member 10 ensures that the end of the thread is not blocked when it is screwed up. The labyrinth passage so formed permits the pressurized vapor to reach the interior of cylinder 15 and so actuate the indicator piston 19 but does not permit passage of the powder material to the cylinder interior.

It is to be understood that the invention may be embodied in alternative forms of construction, for example, the elastomeric sealing element may be located in a groove in an interior wall of a cylinder defined by body member 10 and a co-acting plunger member may have a stepped piston periphery co-acting therewith. In this case a greater diameter portion of said piston will be directed towards the interior of the pressure assembly. It is also to be understood that the first or body member 10 could have a constriction or sealing ring formed or mounted on its radially outer periphery for co-operation with a sealing ring or constriction respectively provided on the interior of a hollow cup-shaped plunger member in sliding telescopic engagement therewith. Also the constriction providing the resistance to movement of the sealing element may consist of a ridge or protuberance in an otherwise uniform sealing face, for example, a uniform diameter cylinder acting in the same way as cylinder 15 described above.

The operation of the indicator and the reading of the indications given thereby may be sensed from a remote station by electrical or like means if desired, or may serve to actuate a visual and/or alarm signal or safety device.

I claim:

1. A fluid pressure indicator for a fluid pressure containing assembly comprising a first member adapted to be mounted in the assembly so that a duct defined by said member extends between the pressure containing interior of the assembly and its exterior; a second member co-operating with the first member to form a fluid-tight seal for said duct while being movable relative to the first member longitudinally of the duct between a first position at which it is operatively extended towards or into said interior and a second position at which it is operatively withdrawn further from or less far into said interior, fluid pressure within the assembly in use acting on the second member to urge it towards the second position; and actuating means selectively operable from the exterior of the assembly in use to move the second member to the first position and to sense the relative position of the members: characterized in that one of the members (17) mounts an elastomeric annular sealing element (23) for continuous sliding fluid sealing engagement with a sealing face (15) of the other member (10) throughout the full range of said relative movement, and said sealing face includes a constriction (22) at a position intermediate the first and second positions providing a predetermined resistance to movement of the sealing member towards the second position which is only overcome by the application of a load in excess of a pre-determined level to the second member.

2. An indicator according to claim 1 characterized in that the first member (10) is a cylinder, the duct being defined by an interior wall (15) thereof; and the second member (17) is a piston movable axially within the cylinder between the first and second positions.

3. An indicator according to claim 2 characterized in that the elastomeric sealing element (23) is located in a radial groove (24) in the periphery of the piston (19), the sealing face consists of said interior wall of the cylinder (15), and the constriction (22) is formed by one end of a reduced diameter portion of the cylinder interior.

4. An indicator according to claim 2 characterized by a closure (30) operatively mounted on the end of the cylinder (15) which adjoins the assembly interior and defining a labyrinth passage (31) permitting pressurized fluid to enter the duct of the first member (10) but substantially preventing a pulverulent material operatively contained in said interior from reaching said duct.

5. An indicator according to claim 4 characterized in that said closure (30) is a cap screw engaged on said cylinder and the labyrinth passage is defined by the interengaged screw threads (31) thereof.

6. An indicator according to claim 1 characterized in that the elastomeric sealing element (23) is an O-ring.

7. An indicator according to claim 6 characterized by a threaded collar (27) in screw engagement with a remaining part of the member (17) in which said ring (23) is operatively located, the groove (24) being defined between a radial face (26) of the collar and a radial face (25) of said other part, enabling adjustment of the effective width of the groove for variation in the effective diameter of the ring.

8. An indicator according to claim 7 characterized in that the pre-set positioning of the collar (27) is fixed by means of an adhesive.

9. An indicator according to claim 1 characterized in that said actuating means is a manually operable plunger (18) mounted on or integral with the second member (17) and extending through said duct (16) to the exterior of the assembly in use, the relative position of the members (10, 17) being sensed by measuring the extent to which the plunger protrudes from the duct.

* * * * *

UNITED STATES PATENT OFFICE
CERTIFICATE OF CORRECTION

Patent No. 3,738,311         Dated  June 12, 1973

Inventor(s)    Ronald John Walter Appleton

It is certified that error appears in the above-identified patent and that said Letters Patent are hereby corrected as shown below:

On the Abstract Page, the Foreign Application Priority Data should be inserted at the proper place as follows:

-- January 22, 1971    Great Britain         3004/71--

Signed and sealed this 12th day of March 1974.

(SEAL)
Attest:

EDWARD M. FLETCHER, JR.                C. MARSHALL DANN
Attesting Officer                      Commissioner of Patents